United States Patent [19]

Specken

[11] 4,069,152

[45] Jan. 17, 1978

[54] CLARIFICATION OF CLAY CONTAINING WATER

[76] Inventor: Gerald A. Specken, 10719 Hardisty Drive, Edmonton, Alberta, Canada

[21] Appl. No.: 680,026

[22] Filed: Apr. 26, 1976

[51] Int. Cl.² ............................................. C02B 1/20
[52] U.S. Cl. .................................. 210/50; 208/11 LE; 210/51; 210/53; 210/54; 210/63 R
[58] Field of Search .............. 208/11 LE; 210/42, 45, 210/47, 48, 50–54, 63 R, 63 Z; 252/8.5 A, 8.5 B

[56] References Cited

U.S. PATENT DOCUMENTS

| | | | |
|---|---|---|---|
| 1,094,731 | 4/1914 | Linden | 210/52 |
| 3,171,800 | 3/1965 | Rice et al. | 210/63 R |
| 3,483,120 | 12/1969 | Hatch | 210/51 |
| 3,487,003 | 12/1969 | Baillie et al. | 210/42 R |
| 3,711,402 | 1/1973 | Zumbrunn et al. | 210/63 R |
| 3,723,310 | 3/1973 | Lang | 210/54 A |
| 3,921,733 | 11/1975 | Clampitt | 252/8.5 A |

*Primary Examiner*—Charles N. Hart
*Assistant Examiner*—Peter A. Hruskoci
*Attorney, Agent, or Firm*—Robert F. Delbridge; Arne I. Fors

[57] ABSTRACT

Clay-containing water from processing of oil or bituminous sands or from oil or gas well drilling sites is clarified by treating the water with a sufficient amount of an alkali permanganate to effect adequate clarification. The water may also be treated with an anionic and/or non-ionic polyelectrolyte to expedite the clarification of the water.

17 Claims, No Drawings

CLARIFICATION OF CLAY CONTAINING WATER

This invention relates to the clarification of clay-containing water of the kind which is obtained from the processing of oil or bituminous sands or from oil and gas well drilling sites.

As is well known, various commercially useful compounds can be extracted from oil or bituminous sands, which are sometimes known as tar sands. One of the major sources of such sands is the Athabasca sands in Northern Alberta, Canada. One commercial process for the extraction of compounds from such sands involves the use of hot water. During the extraction process, the water acquires a significant concentration of suspended clay particles, as well as a large variety of dissolved organic and inorganic compounds. For commercial purposes, it is desirable that the water used in the extraction process is recycled. However, before this can be done, the clay content has to be reduced to an acceptable level. In other words, the water with clay particles in suspension from the hot water extraction process has to be clarified before it can be recycled to the process.

The clarifiction of such water presents considerable problems, particularly in view of the fact that the clarification process unit must be both technically and economically suitable. The water will probably contain a relatively large concentration of suspended clay particles, and this concentration may vary over a relatively wide range according to the actual nature of the oil or bituminous sands being treated. For example, the clay content of waste water from a hot water process for treating oil or bituminous sands may be in the range having a lower value of the order of 500 ppm (parts per million) by weight of clay in water and an upper value of the order of 100,000 ppm. Thus, any suitable clarification process should be effective for treating clay-laden water with clay concentrations in this range which, it will be noted, has an upper value of about 200 times greater than its lower value.

Also, the clay-containing water from the oil or bituminous sands process mentioned above is usually a very complex solution in which varying amounts of oil or bituminous hydrocarbon fractions are dissolved and/or adsorbed on the clay particles. Furthermore, the actual chemical composition of the clay particles varies according to the geological history of the site from which the clay originates.

It is known, for example, that the clay in waste water from hot water processes used on oil or bituminous sands is much higher in concentration and quite different in properties from clay particles which are found in suspension in water such as river water. For example, turbid river waters typically contain a suspension of clay particles of only of the order of about 10 to 100 ppm which, upon clarification, may be reduced to the order of about 3 to 30 ppm. It can therefore readily be seen that the clarifiction of clay-laden water obtained from the processing of oil or bituminous sands, with its complex composition and high concentration of clay particles, is quite different from the clarification of turbid water such as river water. Apart from its smaller concentration of suspended clay particles, the clay found in river water does not have the adsorbed hydrocarbons found on clay contained in water from oil or bituminous sands hot water processing. It is in particular the adsorbed hydrocarbons and the much higher concentrations of suspended clay particles which make the clarification of water from oil or bituminous sands processing quite unpredictable, and certainty not consistent with clarification methods used for turbid river water.

U.S. Pat. No. b 3,487,003 (Baillie et al) and U.S. Pat. No. 3,526,585 (Camp), both assigned to Great Canadian Oil Sands Ltd, are of general interest in that they describe broad proposals for the clarification of waste water from a hot water process for the extraction of various compounds from oil or bitiminous sands.

The comments made above with respect to clay contained in water from oil or bituminous sands processing also generally apply to water from oil and gas well drilling site sumps. There is also a need for a commercially feasible process for the clarification of such water, and the present invention is also applicable to the clarification of such water.

Clay consists primarily of hydrated silicates of aluminum, and in water is usually present as suspended charged particles. This adds to the unpredictability of the behaviour of the suspended clay particles, particularly in conjunction with the relatively high clay concentrations and adsorbed hydrocarbons of the water orignating in the manner described above.

It is therefore an object of the invention to provide a process for the clarification of clay-containing water of the kind which is obtained from the processing of oil or bituminous sands or from oil or gas well drilling sites.

According to the invention, it has been found that such clay-containing water can be clarified to a suitable extent by the use of an alkali permanganate, such as potassium permanganate. The permanganate is preferably supplied to the water at a concentration in the range of from about 0.5 to about 500 ppm by weight, the actual amount required depending upon the clay concentration in the water which, as mentioned above, will most likely be in the range of from about 500 to about 100,000 ppm.

In general, a concentration of permanganate in the range from about 20 to about 100 ppm will be sufficiently effective. The actual amount of permanganate required for any specific clay-containing water of the kind concerned can be determined by routine trial and experiment. In any particular case, it is desirable to use as little permanganate as possible so as to reduce the cost of the clarification process.

It has been found that water of the kind concerned can be adequately clarified by the use of the permanganate alone without requiring additional steps, such as aeration or pH adjustment or the use of some other coagulant. By adequate clarification is meant substantial reduction in the clay concentration, down to perhaps as low as 100 ppm. The reason for the success of the permanganate treatment with clay-containing water of the kind concerned is not clear, but it is thought that the permanganate somehow affects the adsorption of hydrocarbons by the clay particles with the result that the clay particles are not kept apart but proceed to coagulate.

In some cases, the use of permanganate alone may result in the clarification process taking rather longer than is desired in commercial practice. In accordance with a further feature of the invention, it has been found that the clarification process can be expedited by the addition of a water-soluble anionic and/or non-ionic polyelectrolyte either before or after the addition of the permanganate. The polyelectrolyte acts as a flocculant. An anionic polyelectrolyte is preferred.

The clarification of the clay-containing water depends on the rate of collision of the suspended clay particles, the permanganate promoting the agglomeration of the clay particles upon collision. This increase in the rate of clarification when the permanganate treatment is preceded or followed by addition of a polyelectrolyte of the kind described above is thought to be due to an effective increase in the rate of collision, the increase perhaps being due, at least in part, to the attractive forces between the charged clay particles and the polyelectrolyte molecules. It has been found that the polyelectrolyte is most effective in increasing the rate of clarification if it is added to the clay-containing water immediately after addition of the permanganate.

Polyelectrolytes are, of course, well known but again their behaviour with clay particles suspended in water is not predictable, particularly when the clay particles are present in relatively high concentrations and have adsorbed hydrocarbons, as is the case with the clay-containing water with which the present invention is concerned. Again, it is believed that the success of the addition of a polyelectrolyte of the kind described above, may be due to the clay particles, which are probably platelets with a definite but irregular shape and electrical charge, being somehow readily compatible with such a polyelectrolyte. There is great complexity in te chemistry of clay particles, particularly with adsorbed hydrocarbons, the exact nature of which may not be known. There is similar complexity in the chemistry of polyelectrolytes which have anionic, non-ionic or cationic characteristics of various strengths and which have very high molecular weights, usually over one million.

The term "strength" as applied to a polyelectrolyte refers to the number of sites on the polyelectrolyte molecule which react with the clay particles compared to the number of possible such sites. Thus, the term "medium strength" as applied to a polyelectrolyte mens that the polyelectrolyte molecule has a number of sites (which react with the clay particles) which is in the medium area of the range of a number of possible such sites. This is in contrast to a polyelectrolyte with relatively few such sites, known as a low strength polyelectrolyte, and a polyelectrolyte with a relatively large number of such sites, known as a high strength polyelectrolyte.

As an example of the unpredictbility of the clarification of water containing suspended clay particles of various kinds and concentrations, it is interesting to note the teaching of U.S. Pat. No. 3,483,120 (Hatch). Hatch is concerned with turbid river water. Such river water may typically contain suspended clay particles at a concentration in the range of 10 to 100 ppm. Hatch teaches that, to clarify such water down to a turbidity of 4 to 20 milligrams per liter, which is about 4 to 20 ppm, an alkali permanganate and a cationic polyelectrolyte are required. Further, Hatch shows that the use of an alkali permanganate and an anionic polyelectrolyte is not satisfactory.

Hatch, of course, is concerned with clarification of turbid river water from a clay concentration of probably about 30 to 100 ppm (although Hatch does not give an original turbidity concentration) down to a few ppm. This is in contrast to the present invention which is concerned with the clarification of water containing clay particles with adsorbed hydrocarbons and with a concentration of anything from 500 to 100,000 ppm down to about 100 ppm or less. The contrast between the water clarified by Hatch and his method of clarification on the one hand, and the clay-containing water and the method of clarification according to the present invention on the other hand, are not only clearly apparent, but illustrate the differences between the water treated by Hatch and the water treated by the present invention, as well as the unpredictability of the behaviour of the different kinds of water treated.

It is also interesting to note that U.S. Pat. No. 3,723,310 (Lang et al) is concerned with tailings water from tar sands processing, but suggests a rather complicated clarification process utilizing primary and secondary flocculants. Also of general interest is U.S. Pat. No. 3,171,800 (Rice et al) which describes the use of permanganate, a coagulant and a polyelectrolyte for the removal of iron and manganese values.

There is thus no suggestion in the prior art discussed above of applicant's solution to the problem of clarifying water containing suspended clay particles with adsorbed hydrocarbons with such clay particles being present in relatively high concentrations.

The polyelectrolyte utilized in accordance with the invention is, as mentioned above, preferably an anionic polyelectrolyte and will usually be added at a concentration in the range of from about 1.0 to about 100 ppm.

The actual strength (as previously defined) and concentration of polyelectrolyte required for a particular water sample can be determined by routine trial and experiment. It is desirable for economic reasons not to use an excessive amount of polyelectrolyte, although the cost of permanganate is more significant in the overall economics of the process than the costs of the polyelectrolyte. In general, a concentration of polyelectrolyte in the range of from about 1.0 to about 20 ppm will probably be sufficiently effective.

Although the polyelectrolyte may be anionic or non-ionic, anionic polyelectrolyte is usually preferred as it is more effective. In one specific case, a medium strength (20–30% hydrolyzed) anionic polyelectrolyte of the polyacrylamide kind with a molecular weight believed to be in the range of 5–15 million, and sold under the name AQUAFLOC 466 by Dearborn Chemical Company, was found to be most effective having regard to the relevant criteria of dosage, settling rate and water clarity.

In a typical hot water process for extracting various compounds from oil or bituminous sands, water and steam are first mulled with the sands to form a pulp. By techniques such as settling and air flotation, an oil froth fraction of the pulp is separated from a water and sand fraction. The oil froth is subjected to appropriate further treatment, and the water and sand fraction, known as tailings fluid, is subjected to a sand operation treatment from which the water passes to a clarification process of the kind with which the present invention is concerned. The clarified water is then re-used in the hot water process.

Examples of the clarification of the waste water from such a process, in accordance with the invention, will now be described. In each case, the waste water was obtained from the hot water extraction process carried out by Great Canadian Oil Sands Ltd in Alberta, Canada. The tailings fluid from this process was allowed to settle for several days at room temperature and was then separated into two fractions, the first fraction being a supernatant clay-laden water layer with accompanying light silt, and the second fraction being a settled wet sand layer with heavier silt. The various experiments to be described were carried out on the supernatant clay-laden water layer.

It was found that, from various samples of tailings fluid supplied, the weight of the clay-laden water layer varied from about 30% to about 54% of the total weight of the tailings fluid. In the case of the sample in which the clay-laden water layer was about 30% by weight, the sand in the separated sand layer was dried and weighed and was found to have a weight of about 56% of the weight of the original tailings fluid sample.

For the experiments to be described, the clay-laden water layers from various samples of tailings taken on a given date were mixed with one another to obtain a composite sample pertaining to that sampling date. Each test was carried out using a 350 ml portion of a composite sample of clay-laden water in a cylindrical glass jar about 4.5 inches high and 2.5 inches in diameter. The potassium permanganate dosage was pre-dissolved in distilled water before being added, as also was the polyelectrolyte. The original height of the water sample in the jar was measured, and measurements of the location of the settled solids/separated water interface (i.e. the height of the settled solids layer) were made from time to time. Visual appraisals of the clarity of the separated water layer were also recorded. Each test was continued until the system appeared to have become static.

Visual clarity of the supernatant water layer was estimated according to the follwing scale:

1. Clear (transparent, no haze or opacity)
2. Fairly clear, translucent
3. Clear to opaque
4. Opaque (not transparent)
5. Slightly hazy or milky-hazy
6. Hazy (less clear than opaque, probably ultra fines still suspended)
7. Murky with fines
8. Laden with fines (appreciable solids settled, showing an interface)
9. Heavily laden with fines (some solids settled, with "pseudo interface" developed between the settled solids and fluid containing most of the solids still suspended)
10. No appreciable change from the original agitated sample, completely laden with suspended solids.

The results of the first series of tests are shown in Table 1 below. Independent analysis showed that the clay-laden water samples of Table 1 each contained about 2.2% by weight solids, i.e. about 22000 ppm.

For comparison purposes, measurements were also made on a sample in one jar to which no permanganate or polyelectrolyte was added, the results for this jar being shown in Table 1 as the "control". Also, when polyelectrolyte was added, it was mixed into the sample charge immediately after the addition of the permanganate. For further comparison, tests were also made with cationic polyelectrolytes, and one test was made with an anionic polyelectrolyte alone, i.e. with no potassium permanganate.

TABLE I

| Test No. | Chemical Material | Additive Dosage | Settling Time (hr) | Solids Layer % Total Height | Water Clarity | Remarks |
|---|---|---|---|---|---|---|
| 1 (control) | None | — | 2.2 | 100 | 10 | |
| | | | 2.9 | 100 | 10 | |
| | | | 18.3 | 100 | 10 | |
| | | | 188.0 | 55 | 9 | top 6% of fluid is clear |
| 2 | $KMnO_4$ | 140 ppm | 0.32 | 96 | | |
| | | | 15.8 | 48 | | |
| | | | 23.6 | 47 | | |
| | | | 39.6 | 42 | 1 | |
| | | | 63.6 | 35 | 1 | |
| 3 | $KMnO_4$ (Aqualfloc (466 (medium anionic) | 140 ppm 4.1 pm | | | | coagulation |
| | | | 0.008 | 66 | 6 | |
| | | | 0.05 | 55 | 5 | |
| | | | 0.133 | 52 | | |
| | | | 0.283 | 50 | | |
| | | | 1.57 | 49 | | |
| | | | 25.8 | 48 | 2 | |
| | | | 49.7 | 46 | | |
| | | | 73.7 | 42 | | |
| 4 | $KMnO_4$ (Aquafloc (467 (highly anionic) | 140 ppm 8.2 ppm | | | | coagulation |
| | | | 0.05 | 77 | 5 | |
| | | | 0.15 | 64 | 4 | |
| | | | 0.27 | 60 | 2 | |
| | | | 0.40 | 59 | | |
| | | | 1.68 | 54 | | |
| | | | 2.4 | 54 | | |
| | | | 17.9 | 49 | | |
| | | | 41.9 | 47 | | |
| | | | 66.0 | 44 | | |
| 5 | $KMnO_4$ (Aqualfloc (465 (low to medium anionic) | 140 ppm 4.1 pm | | | | small flocs |
| | | | 0.033 | 75 | 6 | |
| | | | 0.067 | 66 | | |
| | | | 0.15 | 57 | | |
| | | | 0.3 | 55 | 5 | |
| | | | 0.97 | 53 | | |
| | | | 1.68 | 53 | | |
| | | | 17.2 | 48 | 2 | |
| | | | 41.1 | 46 | | |

TABLE I-continued

| Test No. | Chemical Material | Additive Dosage | Settling Time (hr) | Solids Layer % Total Height | Water Clarity | Remarks |
|---|---|---|---|---|---|---|
| | | | 65.0 | 42 | | |
| 6 | $KMnO_4$ (Separan (NP-10 (non-ionic) | 140 ppm 8.2 pm | 0.13 0.62 0.85 17.1 24.8 40.8 64.8 | 93 79 72 47 45 43 39 | 2 1 | very slight coagulation |
| 7 | $KMnO_4$ (Auafloc (464 (low cationic) | 140 ppm 8.2 ppm | 0.18 0.42 1.13 16.6 40.5 | 95 88 74 49 43 | 2 | very slight coagulation |
| 8 | $KMnO_4$ (Hercofloc 815.3 (medium cationic) | 140 ppm 8.2 ppm | 0.18 0.97 16.47 24.3 40.4 64.4 | 96 80 49 47 45 40 | 2 | no coagulation |
| 9 | $KMnO_4$ (Hercofloc 834.1 (high cationic) | 140 ppm 28.6 ppm | 0.30 16.0 39.9 63.9 | 91 50 44 40 | 2 | no coagulation |
| 10 | Aquafloc 466 (medium anionic) | 8.2 ppm | 0.05 15.8 74.0 | 12 12 5 | 9 9 9 | coagulation of some solids pseudo interface top 3% of fluid is clear |

From the results shown in Table I it will be noted that potassium permanganate alon (test 2) produces good clarification of the water within a reasonable time and with a reasonable dose. The contrast with test 1 where nothing was added is self-evident. Test 3 shows the best performance in the clarification of the clay-laden water and this is where 4.1 ppm of medium stength anionic polyelectrolyte AQUAFLOC 466 was added immediately after the permanganate. Performance is judged on the relevant criteria, namely dosage required, solids settling rate and final water clarity.

Test 4 with a high strength (30-40% hydrolyzed) anionic polyelectrolyte AQUAFLOC 467 added after the permanganate also shows good results, although the dosage of polyelectrolyte in test 2 is double that in test 3.

Test 5 shows that, with the sample of clay-laden water concerned, a low to medium strength (10-20% hydrolyzed) anionic polyelectrolyte AQUAFLOC 465 added after the permanganate also gives good results.

Test 6 was made with permanganate and a non-ionic polyelectrolyte, namely SEPARAN NP-10 which is sold by Dow Chemical Company. Reasonable results were obtained, although a longer time was required. Very good water clarity was achieved. (This polyelectrolyte was found to be more advantageous when used with waste water from oil and gas well drilling sites).

Test 7 was made with a low strength (4-8% hydrolyzed) cationic polyelectrolyte AQUAFLOC 464 added after the permanganate. It will be readily observed that this shows no improvement over test 2 where the permanganate was used alone.

All the AQUAFLOC polyelectrolytes used in the tests whose results are shown in Table I are of the polyacrylamide type, with a molecular weight believed to be in the range of 5-15 million and sold by Dearborn Chemical Company Limited.

Tests 8 and 9 were made with medium and high strength cationic polyelectrolytes, HERCOFLOC 815.3 and HERCOFLOC 834.1 respectively added after the permanganate. These polyelectrolytes are sold by Herecules Inc. Again, as with test 6, no improvement is shown over the use of permanganate alone.

Finally, in test 10, the medium strength anionic polyelectrolyte AQUAFLOC 466 was used alone, i.e. without any permangnate. Substantially no clarification occurred, with the same result therefore as in control test 1.

Thus, summing up the results shown in Table I, permanganate alone gives effective results which are improved by addition of an anionic polyelectrolyte, preferably of medium strength. The addition of a cationic polyelectrolyte or the use of a polyelectrolyte without the permanganate is not satisfactory. Tests with various other polyelectrolytes of different kinds were made, with similar results.

In view of these results, tests were made with permanganate and the medium strength anionic polyelectrolyte AQUAFLOC 466 at different dosages, and the results are shown in Table 2. However, it must be pointed out that for practical reasons, the results shown in Table 2 were obtained from tests on a composite sample of clay-laden water different from that used to obtain the results shown in Table I. Hence, the dosages and interface locations shown in Table 2 are not directly comparable with those shown in Table I, although the visual clarity estimates are directly comparable. The solids content of the samples used to obtain the results shown in Table 2 was, in each case, about 2.35% by weight.

In tests 5 and 6, wet sand (taken from the settled sand layer of the original tailings sample) was introduced into the samples with the permanganate and polyelectrolyte. The results show that on settling, the sand and flocculated clay solids occupy approximately the same volume as would have been taken up by the flocculated clay solids alone. However, the introduction of the sand apparently caused an inferior final water clarity. Tests 5 and 6 demonstrate that the clarification process can be

TABLE 2

| Test No. | Chemical Material | Additive Dosage | Settling Time (hr) | Solids Layer & Total Height | Water Clarity | Remarks |
|---|---|---|---|---|---|---|
| 1 (control) | None | | 16.3 | 6 | 9 | pseudo |
| | | | 97.0 | 6 | 9 | interface |
| 2 | KMnO$_4$ | 84 ppm | | | | |
| | (Aquafloc | 2.0 ppm | | | | small |
| | (466 | | 0.17 | 56 | 5 | flocs |
| | | | 0.33 | 53 | | |
| | | | 0.67 | 51 | | |
| | | | 0.92 | 50 | | |
| | | | 16.9 | 43 | 3 | |
| | | | 22.0 | 42 | | |
| | | | 89.0 | 31 | 2 | |
| 3 | KMnO$_4$ | 56 ppm | | | | |
| | (Aquafloc | 2.0 ppm | | | | small |
| | (466 | | 0.033 | 70 | 5 | flocs |
| | | | 0.18 | 55 | | |
| | | | 0.52 | 51 | | |
| | | | 1.02 | 48 | | |
| | | | 17.0 | 36 | 3 | |
| | | | 22.0 | 34 | | |
| | | | 90.0 | 25 | 2 | |
| 4 | KMnO$_4$ | 28 ppm | | | | |
| | (Aquafloc | 2.0 ppm | | | 6 | very |
| | (466 | | 0.067 | 68 | | small |
| | | | 0.20 | 56 | | flocs |
| | | | 0.33 | 50 | | |
| | | | 16.4 | 28 | 4 | |
| | | | 89.4 | 25 | 3 | |
| 5 | KMnO$_4$ | 56 pm | | | | |
| | (Aquafloc | | | | | |
| | (466 | 2.0 ppm | | | | small |
| | Wet sand | 140,000 ppm | | | | flocs |
| | | | 0.10 | 76 | 7 | |
| | | | 0.48 | 53 | 7 | |
| | | | 0.85 | 47 | | |
| | | | 1.27 | 46 | | |
| | | | 3.73 | 41 | | |
| | | | 6.0 | 37 | | |
| | | | 70.8 | 90 (29) | 1 (7) | two |
| | | | 93.8 | 90 (28) | | interfaces |
| 6 | KMnO$_4$ | 56 ppm | | | | |
| | (Aquafloc | | | | | |
| | (466 | 2.0 ppm | | | | small |
| | Wet sand | 140,000 ppm | | | | flocs |
| | | | 0.083 | 75 | 7 | |
| | | | 0.22 | 58 | 7 | |
| | | | 0.68 | 52 | | |
| | | | 2.65 | 48 | | |
| | | | 5.9 | 44 | | |
| | | | 69.7 | 90 (31) | | two |
| | | | 92.7 | 90 (31) | | interfaces |

The results of Table 2 show that good clarification was achieved with a potassium permanganate dosage of 56 ppm and an AQUAFLOC 466 dosage of 2 ppm (test 3). Further reduction of the permanganate dosage down to 28 ppm, with the same polyelectrolyte dosage of 2 ppm, still gave good flocculation and settling rate but the supernatant water was more turbid (test 4).

carried out in the presence of the sand.

Some further experiments were carried out on two other composite samples of clay-lden water, the first having a solids content of 4.7% or 47,000 ppm, and the other having a solids content of 0.96% or 9,600 ppm. The results are shown in Table 3 nd Table 4 respectively.

TABLE 8

| Test No. | Chemical Material | Additive Dosage | Settling Time (hr) | Solids Layer & Total Height | Water Clarity | Remarks |
|---|---|---|---|---|---|---|
| 1 (control) | None | | 3.0 | 100 | 10 | |
| | | | 18.2 | 64 | 9 | |
| | | | 42.4 | 55 | 9 | |
| | | | 75.5 | 52 | | |
| | | | 460.0 | 87 (42) | 1 (7) | |
| 2 | KMnO$_4$ | 31 ppm | | | | |
| | (Aquafloc | | | | | |
| | (466 | 3.2 ppm | | | | coagulation |

TABLE 8-continued

| Test No. | Chemical Material | Additive Dosage | Settling Time (hr) | Solids Layer & Total Height | Water Clarity | Remarks |
| --- | --- | --- | --- | --- | --- | --- |
| | | | 0.033 | 56 | 7 | |
| | | | 0.25 | 63 | | |
| | | | 0.75 | 35 | | |
| | | | 1.88 | 32 | | |
| | | | 4.1 | 29 | | |
| | | | 6.2 | 28 | 7 | |
| | | | 31.9 | 28 | 7 | |
| 3 | $KMnO_4$ (Aquafloc (466 | 56 ppm 3.2 ppm | | | | good coagulation |
| | | | 0.016 | 68 | 4 | |
| | | | 0.067 | 57 | | |
| | | | 0.78 | 41 | 4 | |
| | | | 3.0 | 33 | | |
| | | | 5.1 | 31 | 3 | |
| | | | 29.8 | 25 | 2 | |

TABLE 4

| Test No. | Chemical Material | Additive Dosage | Settling Time (hr) | solids Layer & Total Height | Water Clarity | Remarks |
| --- | --- | --- | --- | --- | --- | --- |
| 1 (control) | None | | 15.4 | 100 | 10 | |
| | | | 39.5 | 100 | 10 | |
| | | | 63.5 | 100 | 10 | |
| 2 | $KMnO_4$ (Aquafloc (466 | 42 ppm 2.0 ppm | | | | coagulation medium to large flocs |
| | | | 0.025 | 72 | 4 | |
| | | | 0.058 | 57 | | |
| | | | 0.117 | 48 | | |
| | | | 0.350 | 40 | | |
| | | | 1.18 | 37 | | |
| | | | 2.25 | 35 | | |
| | | | 6.0 | 31 | 3 | |
| | | | 22.1 | 27 | 3 | |
| 3 | $KMnO_4$ (Aquafloc (466 | 42 ppm 1.2 ppm | | | | coagulation medium to large flocs large flocs |
| | | | 0.050 | 63 | | |
| | | | 0.067 | 55 | 4 | |
| | | | 0.133 | 46 | | |
| | | | 0.20 | 43 | | |
| | | | 0.55 | 38 | | |
| | | | 1.82 | 35 | | |
| | | | 4.5 | 33 | | |
| | | | 5.7 | 31 | 3 | |
| | | | 20.6 | 28 | 3 | |
| | | | 44.6 | 26 | 3 | |
| 4 | $KMnO_4$ | 42 ppm | | | | coagulation |
| | | | 0.250 | 90 | 4 | |
| | | | 1.48 | 62 | 4 | |
| | | | 1.95 | 56 | | |
| | | | 2.75 | 49 | | |
| | | | 4.2 | 44 | 3 | |
| | | | 5.4 | 40 | 3 | |
| | | | 20.3 | 28 | 3 | |
| | | | 44.3 | 25 | 3 | |
| 5* | $KMnO_4$ | 28 ppm | | | | coagulation |
| | | | 0.283 | 95 | 4 | |
| | | | 1.55 | 75 | | |
| | | | 2.8 | 61 | 4 | |
| | | | 17.8 | 35 | 3 | |
| | | | 21.8 | 32 | 3 | |
| | | | 41.8 | 28 | 3 | |
| 6* | $KMnO_4$ (Aquafloc (466 | 28 ppm 1.2 ppm | | | | coagulation medium to large flocs large flocs |
| | | | 0.0167 | 76 | | |
| | | | 0.10 | 48 | 7 | |
| | | | 1.37 | 31 | 6 | |
| | | | 2.63 | 29 | 6 | |
| | | | 17.6 | 21 | 3 to 5 | |
| | | | 23.6 | 20 | | |
| | | | 41.6 | 19 | 3 | |

*initial fluids charge was 700 ml

The results show the best overall performance in test 3 of Table 3 with a permanganate dosage of 56 ppm and an AQUAFLOC 466 dosage of 3.2 ppm. In test 2 of Table 3, with about half the permanganate dosage of test 3, solids settling was at a similar rate, but the water clarity was not as good. However, water of such clarity is probably acceptable for recycling to the hot water extraction process used with oil or bituminous sands, although better clarity would probably be required if the water were to be returned to the environment.

Some tests were carried out in which the sequence of addition of the permanganate and polyelectrolyte was reversed, that is, the polyelectrolyte was mixed into the test charge before the permanganate. Good clarification was achieved by this procedure, provided that the right polyelectrolyte was used, but in general, the settling rate was slightly slower than the comparable test when the permanganate was added first.

Other tests were carried out in which the composite sample was pre-aerated, with unfavourable results. In fact, the use of preaeration appeared to make clarification of the water more difficult. Also, calcium hypochlorite was tried instead of permanganate, again with unfavourble results.

It was also found that the addition of a polyelectrolyte up to two days after the addition of the permanganate led to eventual clarification of the fluid, but only after a much longer sedimentation time. It is therefore desirable to add the polyelectrolyte immediately before or after the permanganate, as this produces dramatically improved results.

Finally, in order to study the effect of permanganate addition on the hydrocarbon compounds dissolved in the tailings fluid, the clay-laden water from a tailings samples was divided into two portions and each was clarified by a different method. The first portion was clarified by flocculation using permanganate addition followed immediately by medium anionic polyelectrolyte, whereas the other portion was clarified by high speed clarified waters, as shown in Table 5.

TABLE 5

| Type of Analysis | Unit | Centrifuged | Flocculated |
|---|---|---|---|
| Biochemical Oxygen Demand | mg/l | 22 | 50 |
| Chemical Oxygen Demand | mg/l | 392 | 348 |
| Phenolic Comounds | mg/l | 0.113 | 0.004 |
| Carbon | | | |
| total | mg/l | 260 | 260 |
| inorganic | mg/l | 143 | 150 |
| organic | mg/l | 117 | 110 |
| Total Kjeldahl Nitrogen | mg/l as N | 15.8 | 15.8 |
| Ammonia Nitrogen | mg/l as N | 14.0 | 14.8 |
| Organic Nitrogen | mg/l as N | 1.8 | 1.0 |
| Nitrate | mg/l | <0.5 | <0.5 |
| Nitrate | mg/l | 0.42 | 1.56 |
| Organic Sulphur Compounds | mg/l as S | 3.3 | <0.1 |
| Hydroxylated Aromatics | mg/l | 1.84 | 0.60 |
| Volatile Organic Acids as Acetic | mg/l | 45.6 | 43.2 |
| Dissolved Aromatics | | | |
| benzene | ppm | 0.45 | <0.01 |
| toluene | ppm | 0.08 | 0.10 |
| Cyanide | mg/l | <0.001 | <0.001 |
| Petroleum Ether Extractables | mg/l | 11.0 | 6.6 |
| Propylene Dichloride Methanol Extractables | mg/l | 4.9 | 16.7 |
| as basic compounds | % | 19 | 25 |
| as amphoteric compounds | % | 26 | 19 |
| as neutral compounds | % | 37 | 39 |
| as phenolic compounds | % | 17 | 3 |
| as acidic compounds | % | 1 | 14 |

Examination of Table 5 reveals that some minor chemical changes to the compounds dissolved in the water occurred when the fluid was flocculated by permanganate and polyelectrolyte. Presumably it was the effect of the strong oxidant that lowered the apparent concentration of components such as sulphur compounds, hydroxylated aromatics, benzene, and the petroleum ether extractables in the water from the flocculation step. Of particular interest is the increase in the propylene dichloride-methanol extractables of the flocculated water over that of the centrifuged water. This increase seems to suggest that some chemical species that had been adsorbed to the clay particles were actually desorbed when the permanganate was added, thereby leaving the surfce of the clay particles unhindered to the charged sites of the polyelectrolyte.

The results described above show especially the advantageous results that can be obtained with various dosages of permanganate immediately followed by a dosage of a medium strength anionic polyelectrolyte.

It was mentioned earlier that the invention is also applicable to the clarification of clay-containing water from oil or gas well drilling sites. The comments made regarding clarification of clay-containing water from processing of oil or bituminous sands also apply generally to clarification of clay-containing water from oil or gas well drilling sites. In the latter case, the initial addition of a coagulant (for example an ionizable salt such as calcium chloride or calcium sulphate) in known manner to provide divalent or trivalent cations may be beneficial in that the subsequent dosage of polyelectrolyte required is reduced. The permanganate and polyelectrolyte will be added subsequently.

Various other embodiments within the scope of the invention will be apparent to one skilled in the art, the scope of the invention being defined in the appended claims.

What I claim as new and desire to protect by Letters Patent of the United States is:

1. A process for the clarification of clay-containing water, said water being selected from the group consisting of water from processing of bitumnous sands and water from oil or gas well drilling sites, said water containing between about 500 to about 100,000 ppm by weight of suspended clay particles, including treating the water with between about 0.5 to about 500 ppm of an alkali permanganate to cause coagulation and subsequent settling of substantially all said suspended clay particles.

2. A process according to claim 1 wherein the clay-containing water is treated with the alkali permanganate before any other chemical clarifying treatment is carried out therewith.

3. A process according to claim 1 wherein the alkali permanganate is potassium permanganate.

4. A process according to claim 1 wherein the permanganate concentration is in the range of from about 20 to about 100 ppm.

5. A process according to claim 1 wherein the clay-containing water is also treated with between about 1 and about 100 ppm of at least one polyelectrolyte selected from the group consisting of anionic and non-ionic polyelectrolytes to expedite said coagulation and settling.

6. A process according to claim 5 wherein the polyelectrolyte is a medium strength anionic polyelectrolyte.

7. A process according to claim 6 wherein the medium strength anionic polyelectrolyte is of the polyacrylamide type.

8. A process according to claim 5 wherein the polyelectrolyte concentration is in the range of from about 1.0 to about 20 ppm.

9. A process according to claim 5 wherein the polyelectrolyte is added to clay-containing water immediately after the permanganate.

10. A process for the clarification of clay-containing water, said water being selected from the group consisting of water from processing of bituminous sands and water from oil or gas well drilling sites, said water containing between about 500 and about 100,000 ppm by weight of suspended clay particles, including treating the water with between about 0.5 and about 500 ppm of potassium permanganate and with between about 1 and about 100 ppm of at least one polyelectrolyte selected from the group consisting of anionic and non-ionic polyelectrolytes to cause coagulation and subsequent settling of substantially all said suspended clay particles.

11. A process according to claim 10 wherein the polyelectrolyte is an anionic polyelectrolyte.

12. A process according to claim 11 wherein the anionic polyelectrolyte is of the polyacrylamide type.

13. A process for the clarification of clay-containing water, said water being selected from the group consisting of water from processing of bituminous sands and water from oil or gas well drilling sites, said water containing between about 500 and about 100,000 ppm by weight of suspended clay particles, and said clay particles having hydrocarbons adsorbed thereon, including treating the water with between about 0.5 and about 500 ppm of potassium permanganate, and with between about 1 and about 100 ppm of at least one polyelectrolyte selected from the group consisting of anionic and non-ionic polyelectrolytes to cause coagulation and subsequent settling of substantially all said suspended clay particles.

14. A process according to claim 13 wherein the polyelectrolyte is an anionic polyelectrolyte.

15. A process according to claim 14 wherein the anionic polyelectrolyte is of the polyacrylamide type.

16. A process according to claim 14 wherein the permanganate concentration is in the range of from about 20 to about 100 ppm and the polyelectrolyte concentration is in the range of from about 1.0 to about 20 ppm.

17. A process according to claim 16 wherein the polyelectrolyte is added to the clay-containing water immediately after the permanganate.

* * * * *